Jan. 18, 1949.  S. M. MABRY  2,459,443
TRAY
Filed April 1, 1947

INVENTOR.
STEVE M. MABRY
BY
ATTORNEYS

Patented Jan. 18, 1949

2,459,443

UNITED STATES PATENT OFFICE 2,459,443

TRAY

Steve M. Mabry, Yokena, Miss.

Application April 1, 1947, Serial No. 738,669

2 Claims. (Cl. 311—22)

This invention relates to improvements in trays and particularly to an improved tray adapted to be mounted inside of an automobile body and supported from a body fixture.

While trays adapted to be supported on the body structure of an automobile and particularly on the inner side of an automobile door to extend inwardly of the door have been previously proposed, these previously proposed devices have been expensive, heavy, difficult to place in proper operative position and difficult to adjust so that they will be substantially level when attached to the body structure.

It is among the objects of the present invention to provide a simple and inexpensive tray which is light in weight and can be quickly and easily attached in operative position to extend inwardly of an automobile body, which requires no adjustment of its mechanism in order to bring it to a substantially level condition and which at the same time provides a firm and rigid support for articles placed thereon.

Other objects and advantages will become apparent from a consideration of the following description in conjunction with the accompanying drawing wherein.

Figure 1:
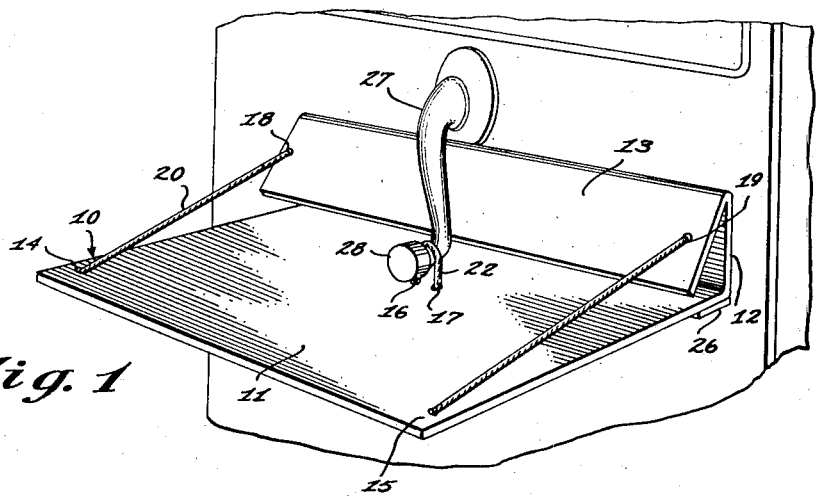
Figure 1 is a perspective view of a tray illustrative of the invention shown in operative position attached to the inner side of a door of an automobile body.
Figure 2:
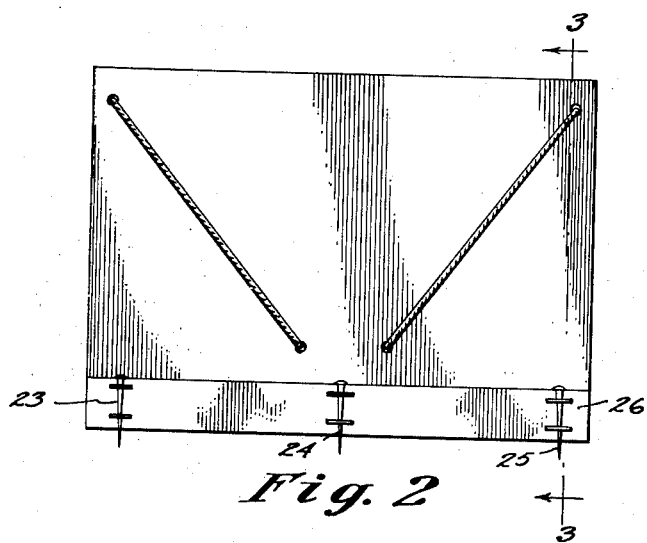
Figure 2 is a bottom plan view of the tray illustrated in Figure 1.
Figure 3:
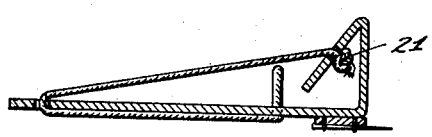
Figure 3 is a transverse sectional view on the line 3—3 of Figure 2.

With continued reference to the drawing the improved simplified tray comprises a sheet 10 of material such as heavy carboard or light metal having a major flat portion 11 with an intermediate portion 12 at one edge thereof folded up to a position in which it is substantially perpendicular to the major portion 11 and a flap portion 13 folded downwardly toward the major portion 11 from the edge of the intermediate portion 12 remote from the portion 11. The major portion 11 is provided with two apertures 14 and 15 located one at each outer corner thereof and with two apertures 16 and 17 located close together near the center thereof, and the folded over flap portion 13 is provided with two apertures 18 and 19 located one near each end thereof. A cord or strand 20 has one end knotted, as indicated at 21 in Figure 3, and is then passed through the aperture 18, the aperture 14, the aperture 16, the aperture 17, the aperture 15 and the aperture 19 where its end is provided with a knot similar to the knot 21. This cord thus provides two raised portions located one at each end of the major portion 11 and a loop 22 in the central area of the portion 11.

A plurality of pins, as indicated at 23, 24 and 25, are secured to the under surface of the portion 11 along the line where the portion 12 is folded upwardly, these pins being attached to a reinforcing strip 26 which is in turn attached to the under surface of the tray portion 11.

In placing the tray in operative position, the window crank handle 27 of the automobile door is first turned to a position in which it extends vertically downward. The loop 22 is then fitted over the knob 28 of the window handle, the tray portion 11 is brought to a substantially level position and the tray is then moved towards the door to force the pins 23, 24 and 25 into the upholstery of the door. The tray will then be supported by the door handle and the pins in a substantially level condition inside of the door. The intermediate portion 12 of the tray bears against the inner surface of the door to assist in maintaining the tray in proper position and the folded over flap portion 13 bears against the handle 27 to assist in adjusting the tray to the particular arrangement of the window handle and the door. The cord or strand 20 holds up the outer edge of the tray portion 11 transmitting the loads imposed by the weight of articles on the tray to the portion 13 which in turn transfers them to the handle 27.

The tray is thus firmly and rigidly supported on the door handle which has adequate strength for this purpose, and the pins 23, 24 and 25 serve only as safety devices to prevent the tray from accidently tilting about its support between the loop 22 and the lower end of the door handle.

There is thus provided an extremely simple and inexpensive tray which is easily attached in operative position and provides a strong and rigid support for articles placed thereon.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A tray arranged to be mounted on the inner side of a vehicle door having a window operating handle comprising a rectangular piece of sheet material including an article supporting portion, an intermediate portion folded along one edge of said article supporting portion to a position substantially perpendicular thereto, and a flap portion folded along the outer edge of said intermediate portion toward said article supporting portion, said article supporting portion having an aperture in each outer corner thereof and a pair of closely spaced apertures in the central area thereof and said flap portion having an aperture in each end portion thereof; a cord extending through said apertures to provide a brace between each outer corner of said article supporting portion and the corresponding ends of said flap portion and a window handle engaging loop in the central area of said article supporting portion; and pins secured to the under surface of said article supporting portion in position to project outwardly beyond the fold between said article supporting portion and said intermediate portion.

2. A tray arranged to be mounted on the inner side of a vehicle door having a window-operating handle comprising a rectangular piece of sheet material including an article-supporting portion, an intermediate portion folded along one edge of said article-supporting portion to a position substantially perpendicular thereto, and a flap portion folded along the outer edge of said intermediate portion toward said article-supporting portion, said article supporting portion having an aperture in each outer corner thereof and a pair of closely-spaced apertures in the central area thereof, a cord secured at its ends to the opposite ends of said flap portion and extending through the apertures in the outer corners of said article-supporting portion and through the apertures in the central area of said article-supporting portion to provide a respective brace between each outer corner of said article-supporting portion and the corresponding end of said flap portion and a window-handle engaging loop in the central area of said article-supporting portion, and fabric-engaging elements secured to the under-surface of the edge of said article-supporting portion from which said intermediate portion extends.

STEVE M. MABRY.

REFERENCES CITED

The following references are of record in the file of this patent:

UNITED STATES PATENTS

| Number | Name | Date |
| --- | --- | --- |
| 1,487,475 | Ribyat | Mar. 18, 1924 |
| 2,091,868 | Mattson | Aug. 31, 1937 |